(12) United States Patent
Kimura et al.

(10) Patent No.: US 6,507,461 B1
(45) Date of Patent: Jan. 14, 2003

(54) INERTIAL LATCH FOR AN ACTUATOR IN A DISK DRIVE DEVICE

(75) Inventors: Shinichi Kimura, Fugisawa (JP); Jun Ishikawa, Yokohama (JP); Kohji Takahashi, Sagamihara (JP); Mutsuro Ohta, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/979,224

(22) PCT Filed: Aug. 16, 1999

(86) PCT No.: PCT/JP99/04410

§ 371 (c)(1),
(2), (4) Date: Nov. 20, 2001

(87) PCT Pub. No.: WO00/74056

PCT Pub. Date: Dec. 7, 2000

(30) Foreign Application Priority Data

May 27, 1999 (JP) .............................. 11-147521

(51) Int. Cl.⁷ .............................. G11B 21/22; G11B 5/54
(52) U.S. Cl. .................................................. 360/256.4
(58) Field of Search .............................. 360/256, 256.4, 360/254, 250, 240

(56) References Cited

U.S. PATENT DOCUMENTS

| | | | |
|---|---|---|---|
| 5,305,170 A | * | 4/1994 | Dion ........................ 360/256.4 |
| 5,404,257 A | | 4/1995 | Alt |
| 5,623,384 A | | 4/1997 | Hickox et al. |
| 6,028,746 A | * | 2/2000 | Matsumura .............. 360/256.4 |
| 6,327,119 B1 | * | 12/2001 | Barina et al. ............ 360/256.4 |
| 2002/0044387 A1 | * | 4/2002 | Miyamoto ............... 360/256.4 |
| 2002/0054456 A1 | * | 5/2002 | Misso et al. ............. 360/256.4 |

FOREIGN PATENT DOCUMENTS

| | | |
|---|---|---|
| JP | 9-503608 | 4/1999 |
| JP | 10-302418 | 12/2000 |

* cited by examiner

Primary Examiner—Hoa T. Nguyen
Assistant Examiner—Julie Anne Watko
(74) Attorney, Agent, or Firm—Robert B. Martin; Bracewell & Patterson, L.L.P.

(57) ABSTRACT

An inertial latch for preventing an actuator arm, which is a component of a disk apparatus, from flying out from an unloading position because of an external shock. The actuator arm cannot be prevented from flying out from the unloading position because of repulsion produced when the actuator arm crashes against a stopper, by operation other than an external shock. A latch, for engaging with a point end portion of the actuator arm to prevent the actuator arm from flying out, is provided with a sensing protrusion 16e. When the actuator arm crashes against an outer crash stop, the shock causes the latch to rotate and engage with the actuator arm, whereby the actuator arm is prevented from flying out.

4 Claims, 11 Drawing Sheets

INERTIAL LATCH FOR AN ACTUATOR IN A DISK DRIVE DEVICE

This national stage application claims priority from Japanese Patent Application No. JP 11-147521 filed on May 27, 1999.

BACKGROUND OF THE INVENTION

The present invention relates to a disk apparatus, particularly a latch mechanism for preventing an actuator arm, which is a component of the disk apparatus, from flying out from an unloading position because of an external shock. More particularly, the invention relates to an inertial latch that utilizes an inertial operation.

DESCRIPTION OF THE RELATED ART

Figure 13:
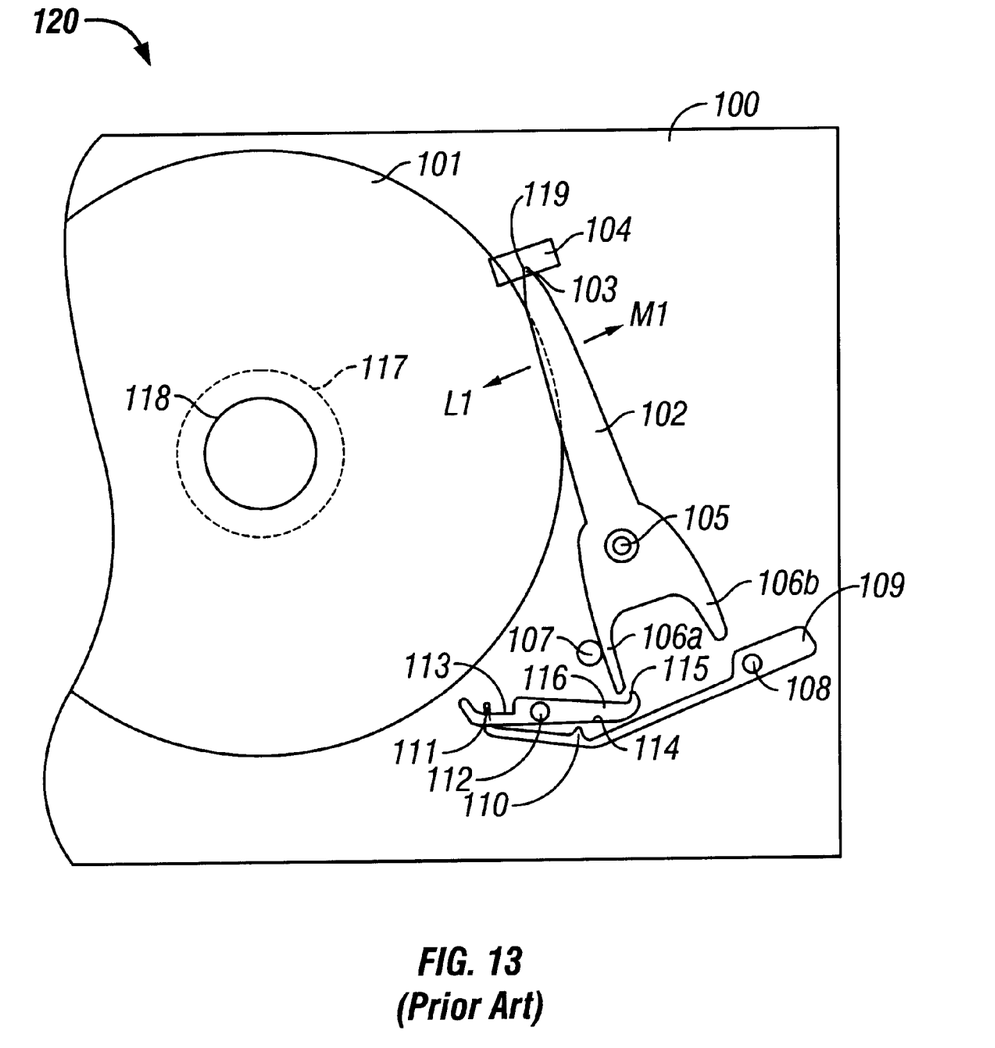
FIG. 13 is a diagram showing the construction of a conventional inertial latch.

FIG. 13 is a diagram showing the essential parts of the inertial latch of a conventional disk apparatus 120.

In the same diagram, the central portion of a disk 101 is held integrally on a hub 118 of a spindle motor 117 disposed on a base 100 and is rotated at a desired speed. An actuator arm 102 is freely rotatably held on a rotating shaft 105 stood up in the base 100 and is driven in the directions of arrows L1 and M1 by means of a voice coil motor (not shown). The voice coil motor will hereinafter be referred to as a VCM.

The actuator arm 102 has a slider 103 formed on the point end portion thereof through suspension means (not shown). At predetermined positions on this slider 103, read and write heads are disposed. If the actuator arm 102 is loaded and rotated in the direction of arrow L1 over the recording surface of the disk 101 being rotated, the slider 103 flies over the recording surface of the disk 101 and the read and write heads are opposed with a predetermined space to the recording surface.

When the actuator arm 102 is unloaded to its home position, a tab 119 of the point end portion of the actuator arm 102 is placed on a ramp 104 and the actuator arm 102 is locked in that position by slight regulating force such as frictional force.

The actuator arm 102 holds the slider 103, and at the opposite positions from this slider 103 with respect to the rotating shaft 105, coil supports 106a and 106b are formed so that the coil of the VCM (not shown) is interposed therebetween.

When the actuator arm 102 is at the position shown in FIG. 13, the coil support 106a abuts an outer crash stop (hereinafter referred to as an outer C/S) 107 having elasticity and therefore the rotation of the actuator arm 102 in the direction of arrow M1 is regulated. This position is referred to as a home position for the actuator arm 102.

A lever 109 curved at an obtuse angle is freely rotatably held on a rotating shaft 108 stood up in the base 100, and in the point end portion of the lever 109, a pair of operating pins 110 and 111 is formed with a predetermined space. A latch 116 is freely rotatably held on a rotating shaft 112 stood up in the base 100, and has a first abutting portion 113 that the operating pin 111 of the lever 109 abuts and a second abutting portion 114 that the operating pin 110 abuts.

The point end portion of the latch 116 on the same side as the second abutting portion 114 with respect to the rotating shaft 112 has a hooked protrusion 115. The hooked protrusion 115 engages with the coil support 106a of the actuator arm 102 at predetermined timing to be described later, thereby regulating rotation of the actuator arm 102 in the direction of arrow L1.

The latch 116 is slightly urged clockwise by an urging means (not shown) so that it does not interfere with rotation of the actuator arm 102 when access to the disk is allowed. With the urging force, the latch 116 and the lever 109 are balanced at an actuator-release position shown in FIG. 13 where both the operating pin 111 and the first abutting portion 113 and also both the operating pin 110 and the second abutting portion 114 abut each other at the same time.

The actuator arm 102 holding the coil, the lever 109, and the latch 116 are each constructed so that the center of gravity is present on each axis of rotation and rotational force does not occur due to a shock that is produced by linear movement.

On the other hand, because of a shock produced by movement accompanied by rotation, there is a possibility that the actuator arm 102 will rotate and fly out from its unloading position. But, the inertial latch has the function of preventing the actuator arm 102 from flying out from the unloading position.

There are various kinds of motions accompanied by rotation and it is not easy to analyze all the motions. But, as a simple example, consider the case where the hard-disk apparatus is rotated on a point on the apparatus and crashed against a fixed surface.

Figure 16:
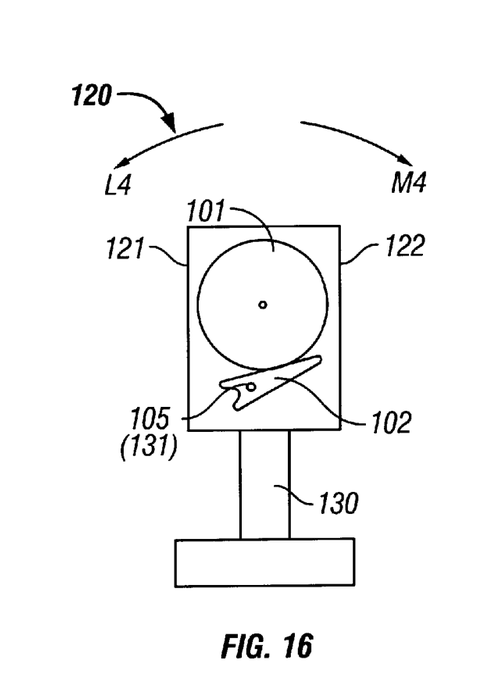
FIG. 16 is a diagram showing a test table that holds a hard-disk apparatus 120 for a shock test.

FIG. 16 shows a test table 130 for giving a shock to the hard-disk apparatus 120. This test table 130 is used for freely rotatably holding the entire hard-disk apparatus 120 and constructed so that the axis of the rotating shaft 131 approximately aligns with that of the rotating shaft 105 of the actuator arm 102.

Figure 14:
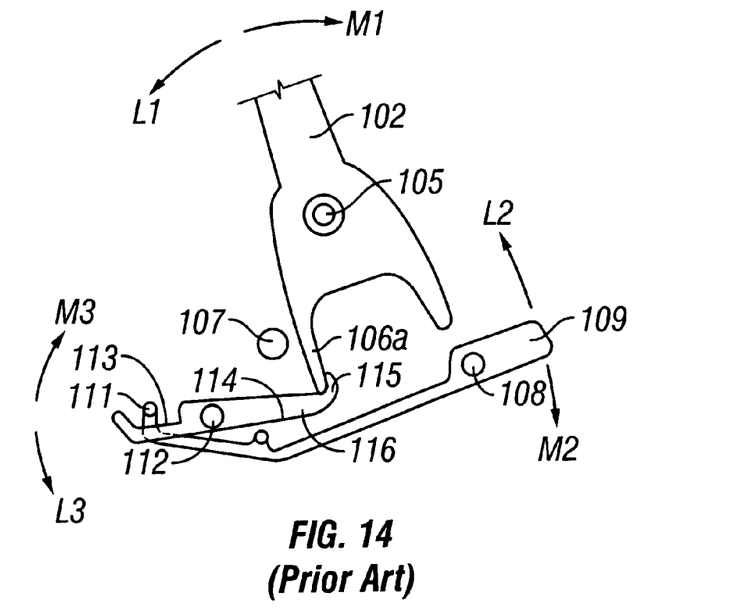
FIG. 14 is a diagram for explaining how the conventional inertial latch operates.
Figure 17:
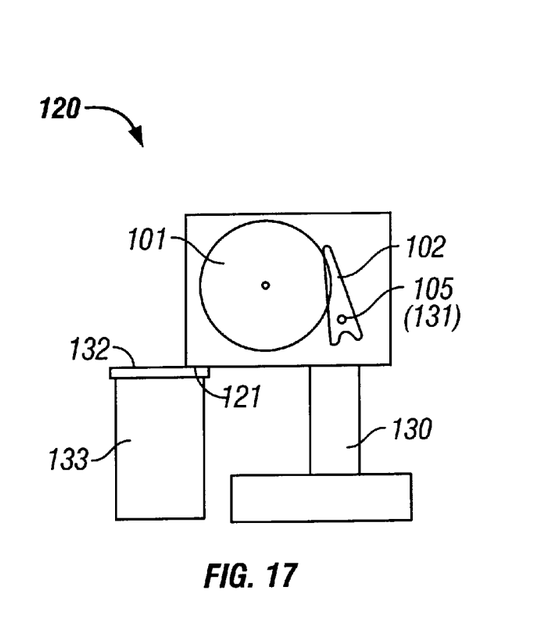
FIG. 17 is an operational diagram showing the condition when in the shock test the hard-disk apparatus 120 crashes against a rubber stopper.

FIG. 16 shows the condition when the disk 101 is located above the rotating shaft 131. If the hard-disk apparatus 120 is rotated from this condition in the direction of arrow L4 to crash the side portion 121 thereof against a rubber stopper 132 on a stopper table 133, as shown in FIG. 17, this shock causes the actuator arm 102, the lever 109, and the latch 116 to rotate counterclockwise, i.e., in the directions of arrows L1, L2, and L3, respectively, as shown in FIG. 14. In the same figure, the movement of the inertial latch at this time is shown. The operating pin 111 of the lever 109 pushes the first abutting portion 113 of the latch 116 and assists the latch 116 to rotate in the direction of arrow L3. The rotation of the latch 116 in the direction of arrow L3 causes the protrusion 115 to engage with the coil support 106a of the actuator arm 102, whereby the rotation of the actuator arm 102 in the direction of arrow L1 is prevented.

Note that it is considered that nearly the same angular acceleration is produced in the actuator arm 102, the latch 116, and the lever 109, respectively. With respect to the angle through which the actuator arm 102 moves from its home position to the position regulated by the latch 116, the angle through which the lever 109 moves from the actuator-arm-release position to the regulating position in order to rotate the latch 116 is designed to be smaller. For this reason, the latch 116 rotates rapidly, whereby the engagement between the protrusion 115 of the latch 116 and the coil support 106a of the actuator arm 102 becomes possible.

Figure 15:
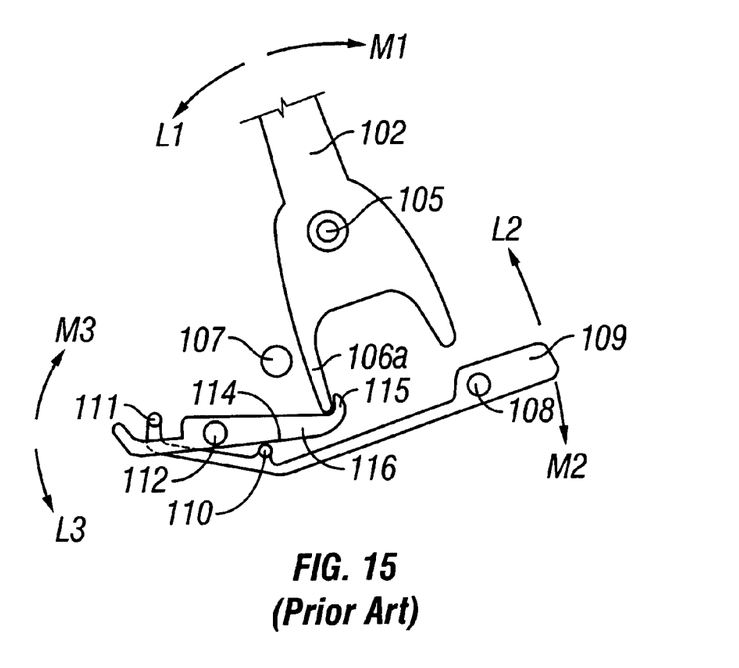
FIG. 15 is a diagram for explaining how the conventional inertial latch operates.
Figure 18:
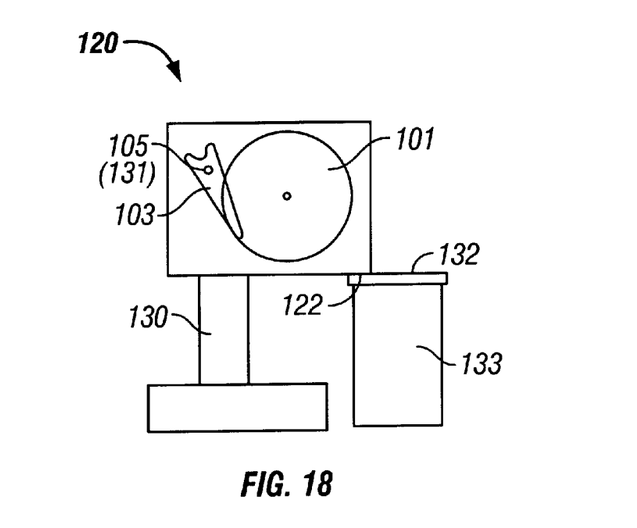
FIG. 18 is an operational diagram showing the condition when in the shock test the hard-disk apparatus 120 crashes against a rubber stopper.

Next, if the hard-disk apparatus 120 is rotated from the condition in FIG. 16 in the direction of arrow M4 to crash the side portion 122 thereof against the rubber stopper 132 on the stopper table 133, as shown in FIG. 18, this shock causes the actuator arm 102, the lever 109, and the latch 116 to rotate clockwise, i.e., in the directions of arrows M1, M2, and M3, respectively, as shown in FIG. 15. In the same figure, the movement of the inertial latch at this time is shown.

Although the latch 116 attempts to rotate in the direction of arrow M3, finally it rotates in the direction of arrow L3, because the force of pushing the second abutting portion 114 of the latch 116 by the operating pin 110 of the lever 109 having a larger moment of inertia is strong.

On the other hand, the actuator arm 102 is rotated once in the direction of arrow M1, but the coil support 106a crashes against the outer C/S 107, which has elasticity and limits rotation in the same direction. With the reaction, the actuator arm 102 rotates in the direction of arrow L1.

However, at this time, the latch 116 rotates in the direction of arrow L3 as previously described and the protrusion 115 engages with the coil support 116a. In a condition such as the one shown in FIG. 15, the rotation of the actuator arm 102 in the direction of arrow L1 is prevented.

In the aforementioned manner, the actuator arm 102 in its home position is prevented from rotating in the direction of arrow L1 because of an external shock, whereby the slider 103 can be prevented from contacting the recording surface of the disk 101 not being rotated.

In an inertial latch such as that mentioned above, when the side portion 121 of the hard-disk apparatus 120 crashes against the rubber stopper 132 on the stopper table 133 as shown in FIG. 17, for example, movement of each part will differ if the shock exceeds a certain level.

Figure 19:
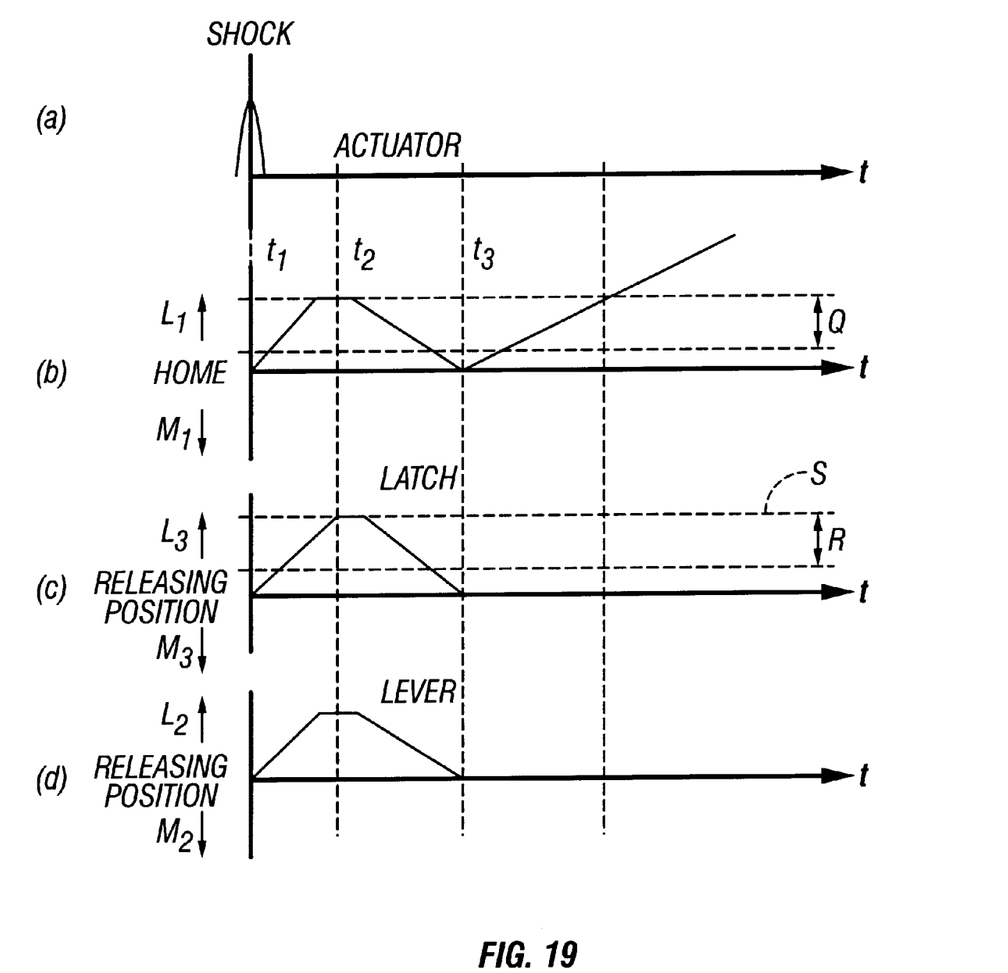
FIG. 19 is a timing diagram showing movement of each part at the time of the shock.

FIG. 19 is a timing diagram showing movement of each part at the time of the shock. The horizontal axis indicates the lapse of time t, and the vertical axis of FIG. 19(a) indicates the strength of the shock. The vertical axis of FIG. 19(b) indicates the rotational amount of the actuator arm 102 in the directions of arrows L1 and M1, the vertical axis of FIG. 19(c) the rotational amount of the latch 116 in the directions of arrows L3 and M3, and the vertical axis of FIG. 19(d) the rotational amount of the lever 109 in the directions of arrows L2 and M2.

In FIG. 19(b) the rotational range Q indicated by two broken lines indicates a rotational range of the actuator arm 102 engageable with the latch 116. In FIG. 19(c), the rotational range R indicated by two broken lines indicates a rotational range of the latch 116 engageable with the actuator arm 102, and the upper broken line S also represents the maximum rotational position of the latch 116.

If a shock occurs at time t1, the actuator arm 102, the lever 109, and the latch 116 all rotate in the counterclockwise directions of arrows L1, L2, and L3, respectively, as previously described. The respective rotations stop around time t2. This is why the protrusion 115 of the latch 116 engages with the coil support 106a of the actuator arm 102. If the first shock is strong, the actuator arm 102 is rotated in the direction of arrow M1 by the reaction of the aforementioned engagement (i.e., crash).

And at time t3, the actuator arm 102 crashes against the outer C/S at the home position. With the reaction, the actuator arm 102 is rotated again in the direction of arrow L1. At this time, the latch 116 has returned to the actuator-release position by the aforementioned urging force, so the actuator arm 102 continues to rotate in the same direction.

If the actuator arm 102 at the home position in this manner is subjected to a shock exceeding a certain level, the rotation in the direction of arrow L1 will no longer be regulated and the slider 103 will contact the recording surface of the disk 101 not being rotated.

If such a situation occurs, scratches will occur on the recording surface of the disk 101 and there will be cases where, because of the contact friction, the spindle motor 117 will no longer be able to rotate.

Besides an external shock, if during operation the actuator arm 102 runs recklessly and crashes into the outer C/S 107, the reaction will cause the actuator arm 102 to rotate in the direction of arrow L1 and there will be a possibility that the actuator arm 102 will fly out over the recording surface of the disk 101. At this time, if the spindle motor 117 stops, the slider 103 will contact the recording surface of the disk 101 and similar inconvenience will occur.

One object of the present invention is to provide a disk apparatus which is capable of reliably preventing rotation of its actuator arm that could not be prevented by the conventional mechanism, when a great shock occurs or when the actuator arm 102 runs recklessly.

SUMMARY OF THE INVENTION

In one embodiment of the present invention there is provided a disk apparatus comprising: an actuator arm with an end rotatable in a first direction from its home position located outside a recording surface of a disk so that the end can be moved over the recording surface. The apparatus also has a latch that is rotatable between a restricted position and a release position. The latch engages the actuator arm at the restricted position to regulate the rotation of the actuator arm in the first direction. In addition, the apparatus has a lever greater in moment of inertia than the latch. The lever engages the latch and rotates to make the latch rotate to the restricted position. Finally, a stopper is used to regulate rotations of the actuator arm from the home position in a second direction opposite from the first direction. Furthermore, at least a portion of at least either the actuator arm or the stopper is elastically deformable so that the actuator arm engages elastically with the stopper. The latch is also provided with an engaging member that engages with the actuator arm to make the latch rotate to the restricted position by a shock produced by the engagement, when the actuator arm is further rotated by the elastic deformation of the elastically deformable member due to the engagement of the actuator arm and the stopper.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
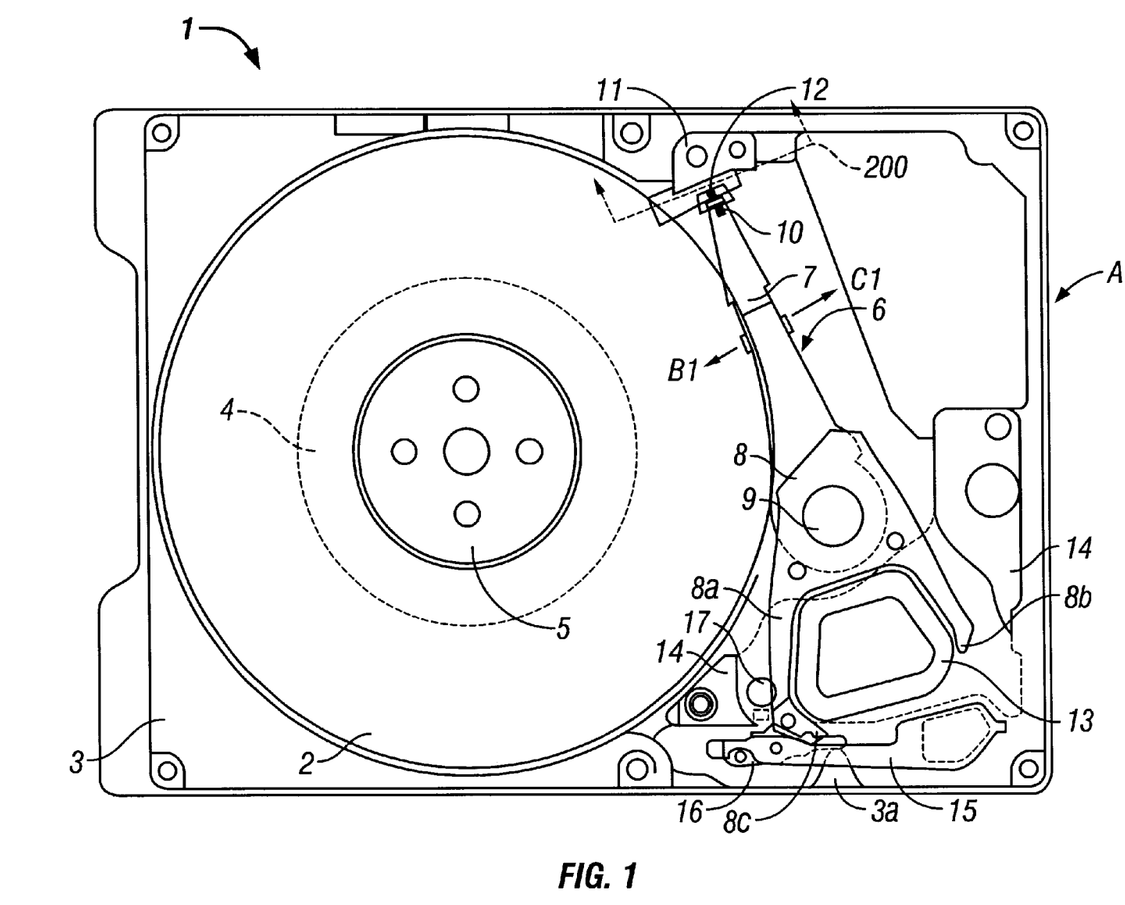
FIG. 1 is a top view of a hard-disk apparatus 1 showing an embodiment of the present invention.
Figure 2:
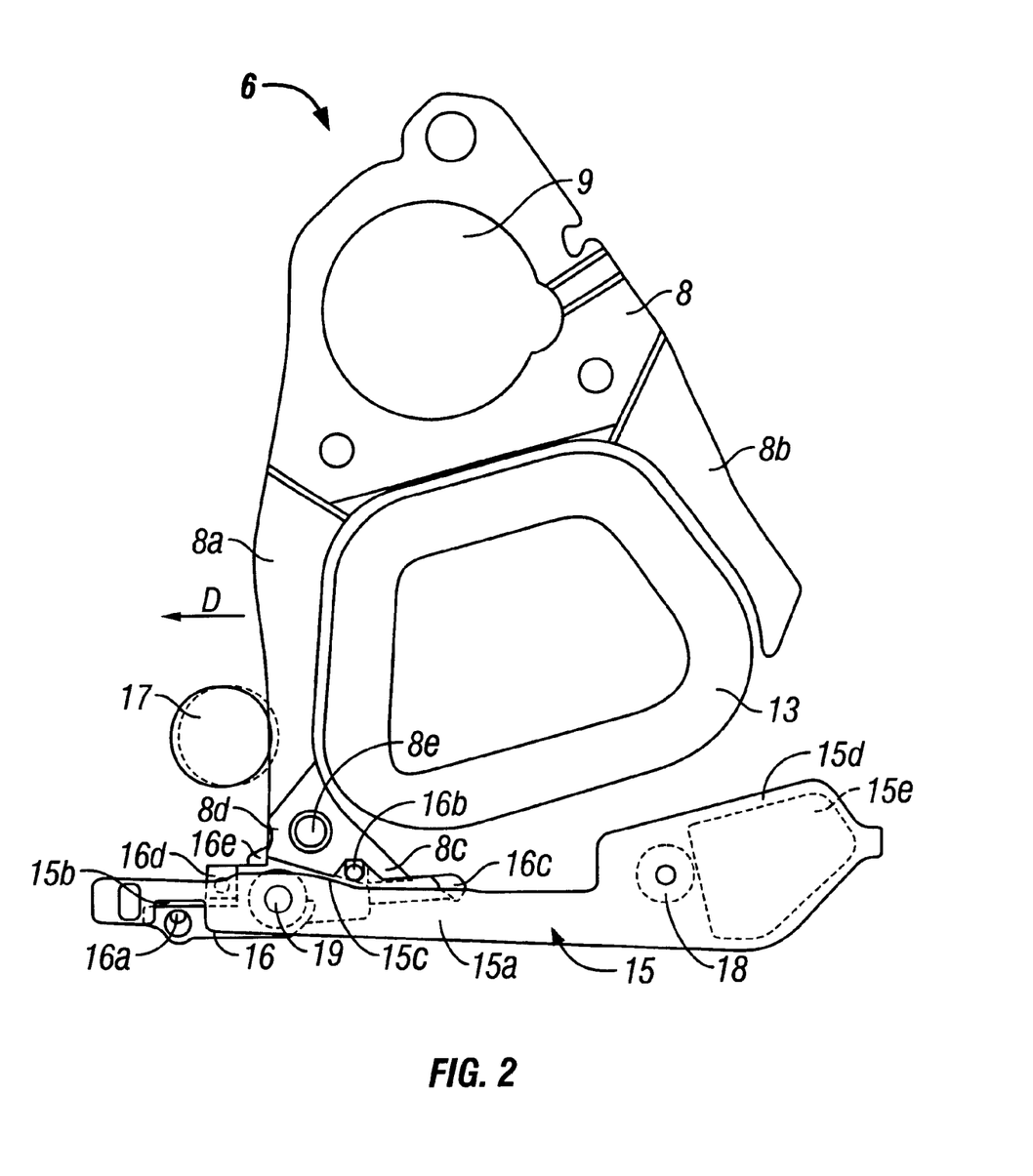
FIG. 2 is a part-enlarged view of the inertial latch part showing the embodiment of the present invention.
Figure 3:
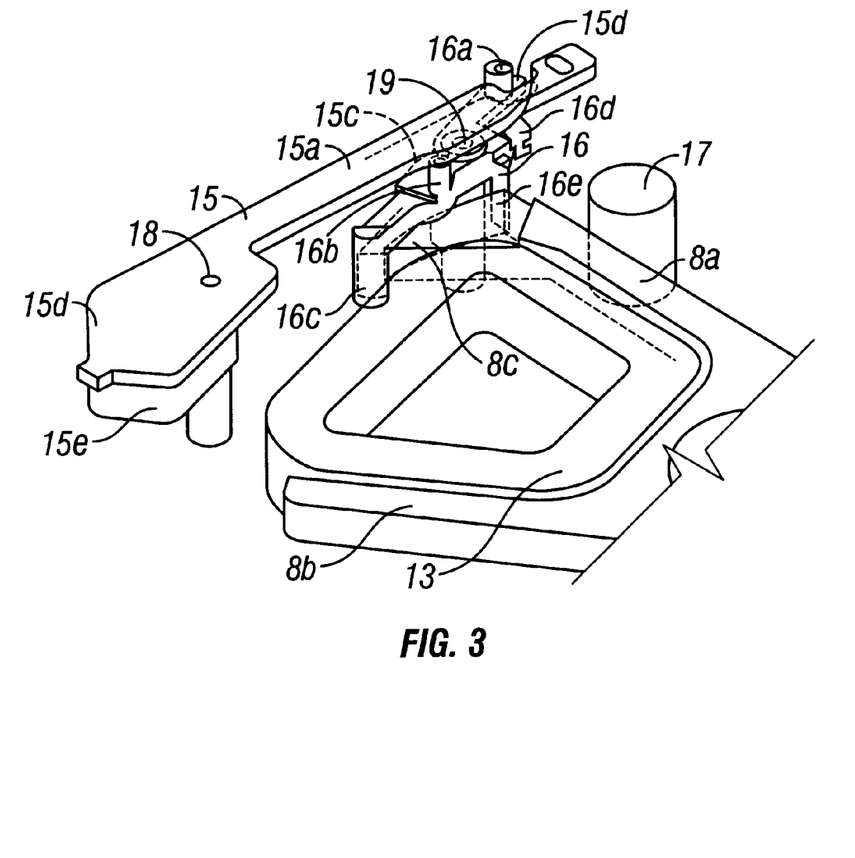
FIG. 3 is a perspective view of the inertial latch part taken obliquely from above (above the paper) along the direction of arrow A shown in FIG. 1.

FIG. 1 is a top view of a hard-disk apparatus 1 showing an embodiment of the present invention, FIG. 2 is a part-enlarged view of the inertial latch part showing the embodiment, and FIG. 3 is a perspective view of the inertial latch part taken obliquely from the upper right (above the paper) along the direction of arrow A shown in FIG. 1.

In the figures, a disk 2 is held integrally on a hub 5 of a spindle motor 4 disposed on a base 3 and is rotated by the spindle motor 4. An actuator arm 6 is formed integrally with a suspension portion 7 and a coil support portion 8. The actuator arm 6 is freely rotatably held by a rotating shaft 9 stood up in the base 3 and is driven in the direction of arrow B1 or C1 by a VCM (described later).

The suspension portion 7 holds a slider 10 formed on the point end portion thereof, and at predetermined positions on this slider 10, read and write heads (not shown) are disposed. When the actuator arm 6 rotates in the direction of arrow B1 and moves over the recording surface of the hard-disk apparatus 1 being rotated, the slider 10 flies over the recording surface of the disk 2 and the read and write heads are opposed with a predetermined space to the recording surface.

A ramp 11 disposed on the base 3 places the tab 12 of the point end portion of the actuator arm 6 thereon when the actuator arm 6 is unloaded to its home position.

Figure 4:
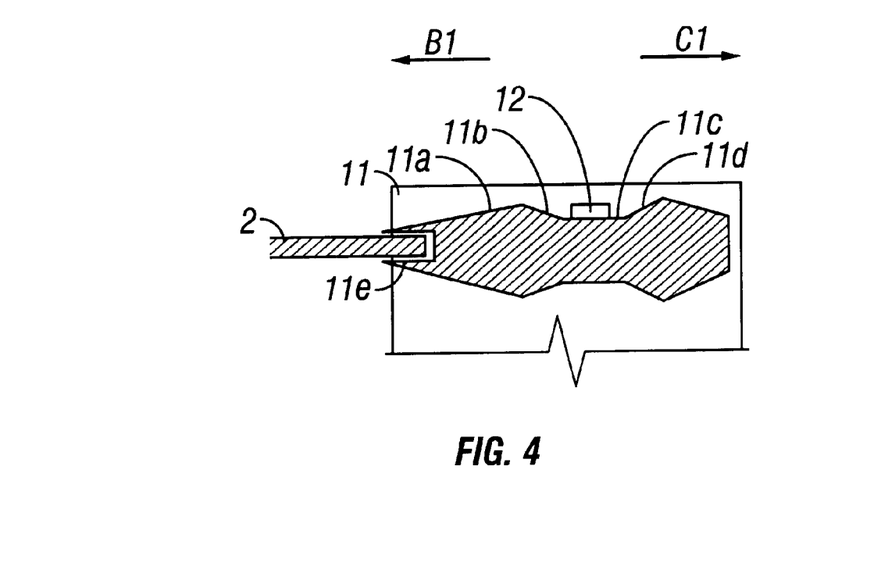
FIG. 4 is a sectional view showing the structure of a ramp 11.

FIG. 4 shows a sectional view of the ramp 11 at the position of index line 200 (FIG. 1). The ramp 11 has a slit 11e for receiving the outer circumferential portion of the disk 2. Above and below this slit lie, a wedge-shaped portion protruding toward the recording surface of the disk 2 is formed. The protruding portion has inclined surfaces 11a and 11b, a flat surface 11c, and an inclined surface 11d lid on the upper side thereof.

The tab 12 is urged downward by the suspension portion 7 (FIG. 1). For this reason, in order for the actuator arm 6 to rotate from its home position in the direction of arrow B1 to move the slider 10 to the recording surface of the disk 2, the tab 12 on the flat surface 11c of the ramp 11 must be moved along the upward inclined surface 11b in the direction of arrow B1 against the downward urging force.

Therefore, the actuator arm 6 is subjected to a returning force in the direction of arrow C1 at the upward inclined surface 11b of the ramp 11 when moving from the home position shown in FIG. 1 in the direction of arrow B1.

The actuator arm 6 holds the slider 10 on the point end of the suspension portion 7, as described above, and a coil support portion 8 on the opposite side from this slider 10 with respect to the rotating shaft 9 has a pair of coil supports 8a and 8b for firmly interposing a coil 13 constituting the VCM therebetween.

An upper magnet holding plate 14 (FIG. 1) is fixed to the base 3 and holds a magnet (not shown) constituting the VCM at a position above and opposed to the coil 13. Note that in FIG. 1, the essential portion of the upper magnet holding plate 14 is cut away for convenience and the contour is shown by a broken line.

Similarly, a lower magnet holding plate (not shown) for holding a magnet constituting the VCM at a position opposed to the coil 13 is disposed below the coil 13.

The aforementioned description has been made for simplification on the assumption that the hard-disk apparatus uses a single one-sided disk 2. But, when data is recorded on both sides of a hard disk, another suspension portion for holding a head that scans the recording surface is prepared. The other suspension portion and the suspension portion 7 of FIG. 1 are stacked with a predetermined space and fixed to the coil support portion 8.

Furthermore, when data is recorded on a plurality of double-sided hard disks, they are integrally held with predetermined spaces in the rotational axis direction of the spindle motor 4 by the hub 5. And suspension portions for holding a head that scans each recording surface are prepared by the number of recording surfaces. These suspension portions and the suspension portion 7 of FIG. 1 are stacked with predetermined spaces and fixed to the coil support portion 8. Since this structure is well known in the background art, a detailed description thereof is omitted.

As best shown in FIGS. 2 and 3, a lever 15, a latch 16, and an outer C/S 17, which constitute an inertial latch, are disposed near the coil support 8a along with the point end portion 8c.

The lever 15 is freely rotatably held on a rotating shaft 18 stood up in the base 3 (FIG. 1). An extension portion 15a extending lengthwise toward one side (first side) with respect to the rotating shaft 18 has an engaging recess 15b and an engaging portion 15c, which are respectively engageable with operating pins 16a and 16b formed in the latch 16 to be described below. The lever 15 also has a balancer 15e held with a wide area portion 15d on the other side (second side) with respect to the rotating shaft 18, whereby the lever 15 is balanced so that the center of gravity is present on the axis of the rotating shaft 18.

Note that the lever 15, which is a rotary member, is constructed of relatively heavy material, such as metal, in order to obtain a desired moment of inertia and is also constructed of non-magnetic material so as not to be subjected to the influence of a magnetic field.

The latch 16 is held by a rotating shaft 19 stood up in the base 3 (FIG. 1) so that it is free to rotate between a home position and a restricted position to be described later. At the positions approximately symmetrical across the rotating shaft 19, a pair of operating pins 16a and 16b extending upward are formed respectively. And the latch 16 is located under the lever 15 and crosses the lever 15 three-dimensionally so that the operating pins 16a and 16b are respectively engageable with the engaging recess 15b and engaging portion 15c of the lever 15.

The latch 16 has a latch piece 16c (FIG. 3) extending downward (in the direction toward the base 3 of FIG. 1), at an end of the latch 16 on the side of the operating pin 16b with respect to the rotating shaft 19. The latch 16 also has magnetic material, such as a magnetic metal piece 16d, attached to the intermediate portion on the side of the operating pin 16a with respect to the rotating shaft 19. Furthermore, near the metal piece 16d and on the side of the operating pin 16a with respect to the rotating shaft 19, the latch 16 has a sensing protrusion 16e, which protrudes slightly in the clockwise direction and extends downward.

The metal piece 16d is attracted by the upper magnet holding plate 14 (FIG. 1) producing magnetic attraction with respect to a magnetic substance by operation of the held magnet. For this reason, the latch 16 is urged slightly in the clockwise direction and rotated, and the rotation is regulated by the projection 3a (FIG. 1) of the base 3.

Figure 5:
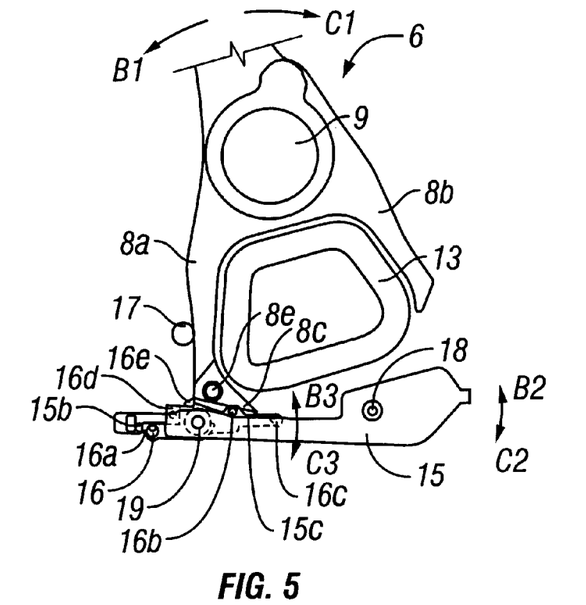
FIG. 5 is a diagram for explaining how the inertial latch part of the hard-disk apparatus of the present invention operates.

For this reason, the latch 16 is balanced either with the operating pins 16a and 16b respectively engaging the engaging recess 15b and engaging portion 15c of the lever 15 or with a slight gap therebetween (FIG. 5). The rotational position of each member at this time will hereinafter be referred to as a home position.

The coil support 8a is curved to the left side of FIG. 2 and the point end portion 8c thereof is pointed in wedge form. This point end portion 8c becomes engageable with the latch piece 16c, when the latch 16 rotates counterclockwise from the home position and reaches the restricted position, as described later. As a result, the counterclockwise rotation of the actuator arm 6 is regulated.

The home position of the latch 16 corresponds to a release position at which the regulation of the counterclockwise rotation of the actuator arm 6 is removed.

The outer C/S 17, stood up in the base 3 and consisting of an elastic body, is a stopper to limit the clockwise rotation of the actuator arm 6 (FIG. 1). When the actuator arm 6 is at the home position, the outer C/S 17 is located at a position on the base 3 that the coil support 8a abuts.

The sensing protrusion 16e of the latch 16 is formed at a position slightly spaced from the contact portion 8d of the coil support 8a, when the actuator arm 6, the lever 15, and the latch 16 are at the aforementioned respective home positions (FIG. 5).

FIG. 2 shows the condition when the actuator arm 6 is rotated slightly from the home position in the clockwise direction. The outer C/S 17 at this time is pushed in the direction of arrow D by the coil support 8a and warps in the same direction from the condition shown by a broken line. Also, the movement of the coil support 8a in the direction of arrow D pushes the sensing protrusion 16a of the latch 16, whereby the latch 16 rotates slightly in the counterclockwise direction. However, the lever 15 keeps its home position, because it is not affected by the counterclockwise rotation of the latch 16.

Notice that the sensing protrusion 16e is an engaging portion that engages with the coil support 8a of the actuator arm 6.

Also, the curved portion of the coil support 8a has a magnetic metal piece 8e embedded therein. With the effect of the magnet (not shown) held on the upper magnet holding plate 14 (FIG. 1) to the metal piece 8e, the actuator arm 6 is urged clockwise near its home position and the coil support 8a is brought into contact with the outer C/S 17.

The lever 15 is constructed so that it has a sufficiently larger moment of inertia, compared with the latch 16. The actuator arm 6 holding the coil 13, the lever 15, and the latch 16 are each constructed so that the center of gravity is present on each axis of rotation and rotational force does not occur due to a shock that is produced by linear movement.

On the other hand, because of a shock produced by movement accompanied by rotation, there is a possibility that the actuator arm 6 will rotate and fly out from its unloading position. But, the inertial latch has the function of preventing the actuator arm 6 from flying out from the unloading position.

There are various kinds of motions accompanied by rotation and it is not easy to analyze all the motions. But, as a simple example, consider the case where the hard-disk apparatus is rotated on a point on the apparatus and crashed against a fixed surface.

Figure 9:
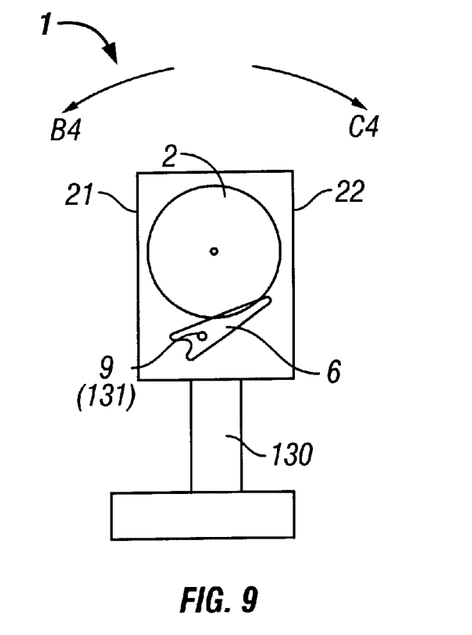
FIG. 9 is a diagram showing a test table that holds the hard-disk apparatus 1 for the shock test of the hard-disk apparatus 1.

FIG. 9 shows a test table 130 for giving the hard-disk apparatus 1 a shock produced by movement accompanied by rotation. This test table 130 is used for freely rotatably holding the entire hard-disk apparatus 1 and constructed so that the axis of the rotating shaft 131 approximately aligns with that of the rotating shaft 9 of the actuator arm 6.

FIG. 9 shows the condition when the disk 2 is located above the rotating shaft 9. In this condition, the actuator arm 6, the lever 15, and the latch 16 are located at the aforementioned respective home positions shown in FIG. 5.

The latch piece 16c of the latch 16 in this condition is at the position that cannot engage with the point end portion 8c of the coil support 8. The actuator arm 6 rotates from its home position in the direction of arrow B1 as needed, whereby the slider 10 can move over the recording surface of the disk 2.

Figure 10:
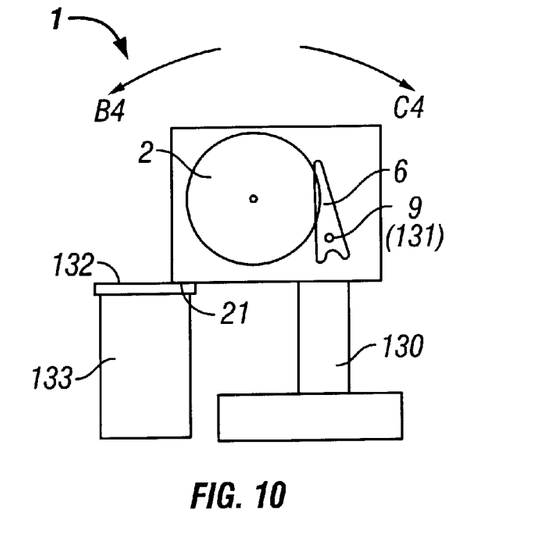
FIG. 10 is an operational diagram showing the condition when in the shock test the hard-disk apparatus 1 crashes against a rubber stopper.

If the hard-disk apparatus 1 is rotated from this condition in the direction of arrow B4 to crash the side portion 21 thereof against a rubber stopper 132 on a stopper table 133, as shown in FIG. 10, this shock causes the actuator arm 6, the lever 15, and the latch 16 to rotate counterclockwise, i.e., in the directions of arrows B1, B2, and B3 respectively shown in FIG. 5.

Figure 6:
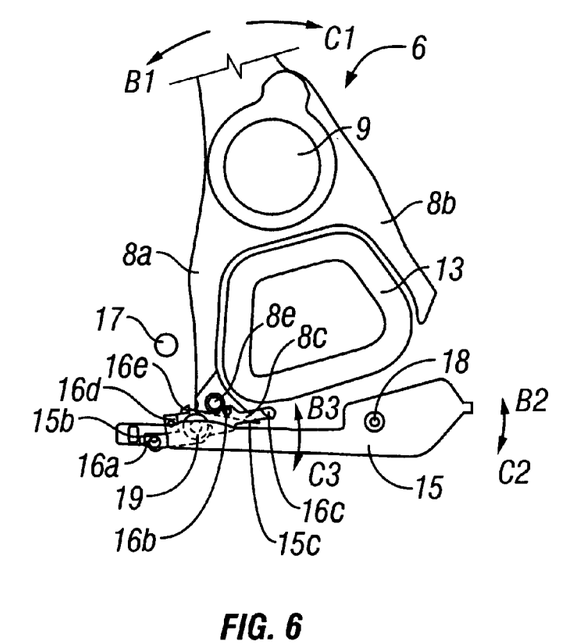
FIG. 6 is a diagram for explaining how the inertial latch part of the hard-disk apparatus of the present invention operates.

FIG. 6 shows the condition immediately after each member has been rotated by this rotational force. The engaging recess 15b of the lever 15 pushes the operating pin 16a of the latch 16 and assists the latch 16 to rotate in the direction of arrow B3. The rotation of the latch 16 in the direction of arrow B3 causes the latch piece 16c to engage with the point end portion 8c of the coil support 8a of the actuator arm 6, whereby the rotation of the actuator arm 6 in the direction of arrow B1 is prevented.

Notice that it is considered that nearly the same angular acceleration is produced in the actuator arm 6, the latch 16, and the lever 15. With respect to the angle through which the actuator arm 6 moves from its home position to the position regulated by the latch 16, the angle through which the lever 15 moves from the home position to the restricted position in order to rotate the latch 16 is designed to be smaller. For this reason, the latch 16 rotates rapidly, whereby the engagement between the latch piece 16c of the latch 16 and the point end portion 8c of the coil support 8a becomes possible.

Figure 7:
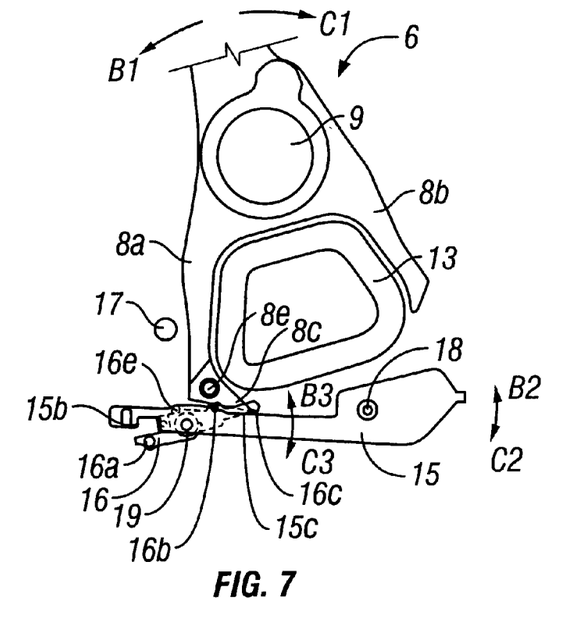
FIG. 7 is a diagram for explaining how the inertial latch part of the hard-disk apparatus of the present invention operates.
Figure 11:
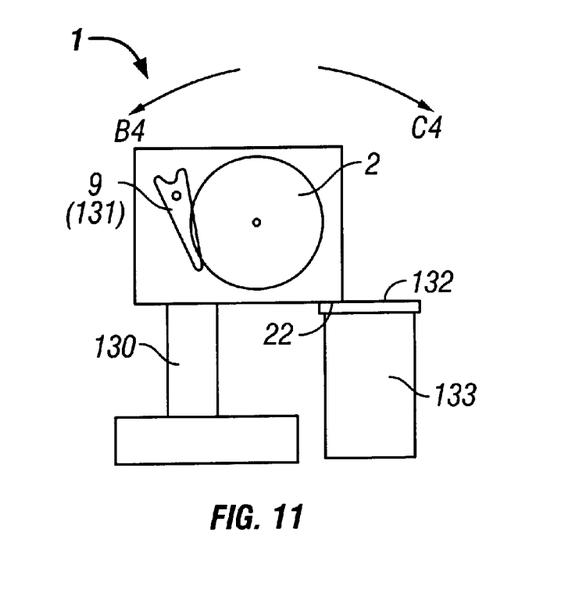
FIG. 11 is an operational diagram showing the condition when in the shock test the hard-disk apparatus 1 crashes against a rubber stopper.

Next, if the hard-disk apparatus 1 is rotated from the condition in FIG. 9 in the direction of arrow C4 to crash the side portion 22 thereof against the rubber stopper 132 on the stopper table 133 at a predetermined circumferential speed, as shown in FIG. 11, this shock causes the actuator arm 6, the lever 15, and the latch 16 to rotate clockwise, i.e., in the directions of arrows C1, C2, and C3, respectively, shown in FIG. 5. FIG. 7 shows the condition immediately after each member has been rotated by this rotational force.

Although the latch 16 attempts to rotate in the direction of arrow C3, finally it rotates in the direction of arrow B3, because the force of pushing the operating pin 16b of the latch 16 by the engaging portion 15c of the lever 15 having a larger moment of inertia is strong. Furthermore, the latch 16 is subjected to a force in the same direction, since the sensing protrusion 16e is pushed by a shock at this time, as described later.

On the other hand, the actuator arm 6 is rotated once in the direction of arrow C1, but the coil support 8a pushes the outer C/S 17, which has elasticity and limits rotation in the same direction. With the reaction, the actuator arm 6 rotates in the direction of arrow B1. Because of the shock produced in pushing the outer C/S 17, it warps in the direction of arrow D, as shown in FIG. 2. With this, the sensing protrusion 16e of the latch 16 is pushed and the latch 16 is subjected to rotational force in the direction of arrow B3 (FIG. 7).

With this rotational force, the latch 16 rotates rapidly to a position engageable with the point end portion 8c of the actuator arm 6 and engages with it, as shown in FIG. 7. This engagement prevents the actuator arm 6 from further rotating in the direction of arrow B3.

Next, in an inertial latch such as the aforementioned, the side portion 21 of the hard-disk apparatus 1 is crashed against the rubber stopper 132 on the stopper table 133, as shown in FIG. 10, for example. At this time, a description will be made of the movement of each part in the case where the shock exceeds a certain level.

Figure 12:
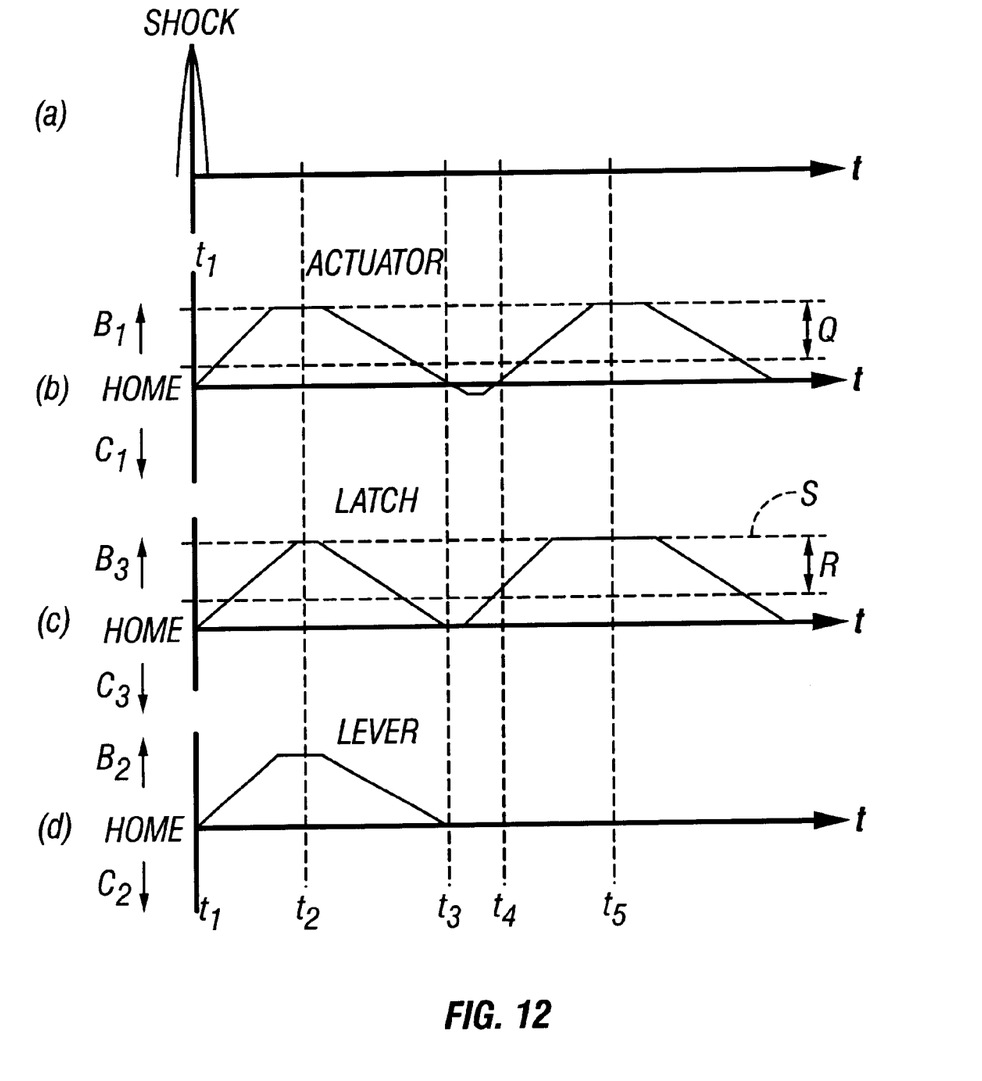
FIG. 12 is a timing diagram showing movement of each part of the inertial latch at the time of the shock.

FIG. 12 is a timing diagram showing movement of each part of the inertial latch at the time of the shock. The horizontal axis indicates the lapse of time t, and the vertical axis of FIG. 12(a) indicates the strength of the shock. The vertical axis of FIG. 12(b) indicates the rotational amount of the actuator arm 6 from its home position in the directions of arrows B1 and C1, the vertical axis of FIG. 12(c) the rotational amount of the latch 16 from its home position in the directions of arrows B3 and C3, and the vertical axis of FIG. 12(d) the rotational amount of the lever 15 from its home position in the directions of arrows B2 and C2.

In FIG. 12(b) the rotational range Q indicated by two broken lines indicates the rotational range of the actuator arm 6 engageable with the latch 16. In FIG. 12(c) the rotational range R indicated by two broken lines indicates the rotational range of the latch 16 engageable with the actuator arm 6, and the upper broken line S also represents the maximum rotational position of the latch 16 in the same direction.

If a shock occurs at time t1, the actuator arm 6, the lever 15, and the latch 16 all rotate in the counterclockwise directions of arrows B1, B2, and B3, respectively, as previously described. The respective rotations stop around time t2. This is why the latch piece 16c of the latch 16 engages with the point end portion 8c of the actuator arm 6 as shown in FIG. 7. The actuator arm 6 is given rotational force in the direction of arrow C1 mainly by the reaction of this engagement (i.e., crash).

Figure 8:
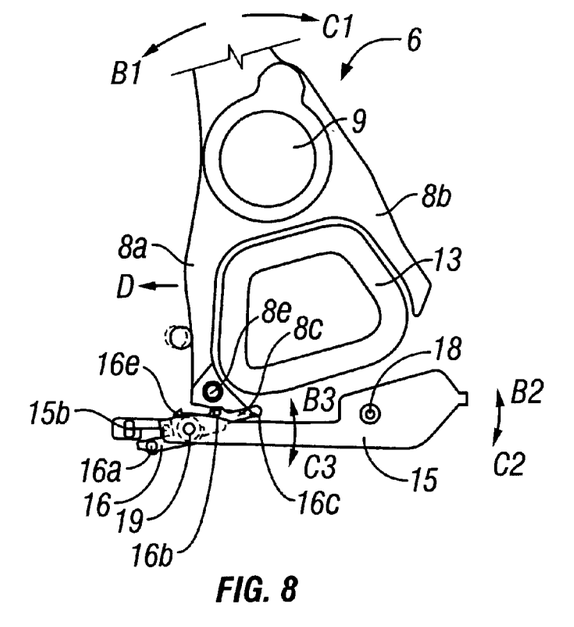
FIG. 8 is a diagram for explaining how the inertial latch part of the hard-disk apparatus of the present invention operates.

And the actuator arm 6 crashes against the outer C/S 17 at its home position around time t3 and warps the outer C/S 17 in the direction of arrow D (FIG. 8). As previously described, the actuator arm 6 also pushes the sensing protrusion 16e of the latch 16 that has already returned to its home position by the urging force given to the metal piece 16d, thereby rotating the sensing protrusion 16e in the direction of arrow B3.

FIG. 8 shows the condition of each member at time t4 at this time. The lever 15 stops at its home position, while the latch 16 goes into the rotational range R engageable due to the shock at this time. And the actuator arm 6 indicates the moment it flies out from its home position.

At time t5, again the latch piece 16c of the latch 16 and the point end portion 8c of the actuator arm 6 engage with each other, whereby movement of both stops. Thereafter, the actuator arm 6 returns to its home position by weak repulsion against the shock at this time, the urging force of the inclined surface 11b of the ramp 11, and the urging force given to the metal piece 8e. Also, the latch 16 returns to its home position by the urging force given to the metal piece 16d and stabilizes.

While a description has been made of the operation of the hard-disk apparatus 1 of the present invention due to an external shock, the hard-disk apparatus 1 also operates effectively when the actuator arm 6 runs recklessly and crashes into the outer C/S 17, during operation of the hard-disk apparatus 1.

That is, the actuator arm 6 at this time makes the outer C/S 17 bend in the direction of arrow D (FIG. 8) and also pushes the sensing protrusion 16e of the latch 16, thereby rotating the latch 16 in the direction of arrow B3. The actuator arm 6 that crashed against the outer C/S 17 rotates in the direction of B1 due to the repulsion, but stops the rotation in the same direction by the engagement between the latch piece 16c of the latch 16 rotated by the sensing protrusion 16e and the point end portion 8c of the actuator arm 6.

In the aforementioned embodiment, while the latch 16 has been provided with the metal piece 16d in order to urge the latch 16 slightly in the clockwise direction by magnetic force, the present invention is not to be limited to this. For example, the rotating shaft 19 may be provided with a toggle spring whose opposite ends are connected to the base and the latch in order to give the latch the same urging force.

Also, in the aforementioned embodiment, the outer C/S 17 is constructed of an elastic body, which is warped by the coil support 8a. This warp enables the actuator arm 6 to rotate slightly in the clockwise direction from its home position. However, the present invention is not to be limited to this. An elastic portion, such as a rubber portion, may be provided in the contacted portion between the coil support 8a and the outer C/S 17 in order to obtain the same operation by deformation of the elastic portion.

In addition, the lever 15 has been employed as a rotary member, but the present invention is not to be limited to a member having this shape. For instance, it may be a disc-shaped member. Various kinds of rotary members are considered, as long as they can achieve the same operation and motion.

According to the present invention, the actuator arm of the disk apparatus rotates due to an external shock, as in the conventional inertial latch and can prevent the slider from falling to the recording surface of the disk which is not rotating. In addition, when there is a great shock, rotation of the actuator arm that could not be prevented by the conventional mechanism can be prevented with reliability. Therefore, the present invention can provide a disk apparatus whose reliability is higher with respect to a shock.

Furthermore, the disk apparatus according to the present invention can prevent the slider with a head from falling to the recording surface of the disk, even when the actuator arm runs recklessly and the spindle motor stops, during operation of the disk apparatus.

While the invention has been shown or described in only some of its forms, it should be apparent to those skilled in the art that it is not so limited, but is susceptible to various changes without departing from the scope of the invention.

What is claimed is:

1. A disk apparatus, comprising:

a disk having a recording surface;

an actuator arm with an end rotatable in a first direction from a home position located outside the recording surface of the disk so that the end is movable over the recording surface;

a latch swingable between a restricted position and a release position, the latch engaging the actuator arm at the restricted position to restrict the rotation of the actuator arm in the first direction;

a rotary member having a moment of inertia that is greater than that of the latch, the rotary member engaging the latch and rotating to make the latch rotate to the restricted position;

a stopper for restricting the rotation of the actuator arm from the home position in a second direction opposite from the first direction;

wherein at least a portion of one of the actuator arm and the stopper is elastically deformable, and when the actuator arm rotates in the second direction, the actuator arm is further rotated by elastic deformation of the portion when the actuator arm abuts the stopper; and wherein the latch has an engaging member that engages the actuator arm to make the latch rotate to the restricted position by a shock produced by the engagement, when the actuator arm is further rotated by the elastic deformation.

2. The disk apparatus of claim 1, wherein the stopper is elastic.

3. The disk apparatus of claim 1, wherein centers of gravity of the rotary member and the latch are located on their respective axes of rotation of the rotary member and the latch.

4. The disk apparatus of claim 1, further comprising means for urging the latch in a direction of releasing engagement between the latch and the actuator arm.

* * * * *

UNITED STATES PATENT AND TRADEMARK OFFICE
CERTIFICATE OF CORRECTION

PATENT NO.   : 6,507,461 B1  
DATED        : January 14, 2003  
INVENTOR(S)  : Kimura et al.

Page 1 of 1

It is certified that error appears in the above-identified patent and that said Letters Patent is hereby corrected as shown below:

<u>Column 6,</u>
Line 4, please delete "lid".

Signed and Sealed this

Second Day of September, 2003

JAMES E. ROGAN
*Director of the United States Patent and Trademark Office*